UNITED STATES PATENT OFFICE.

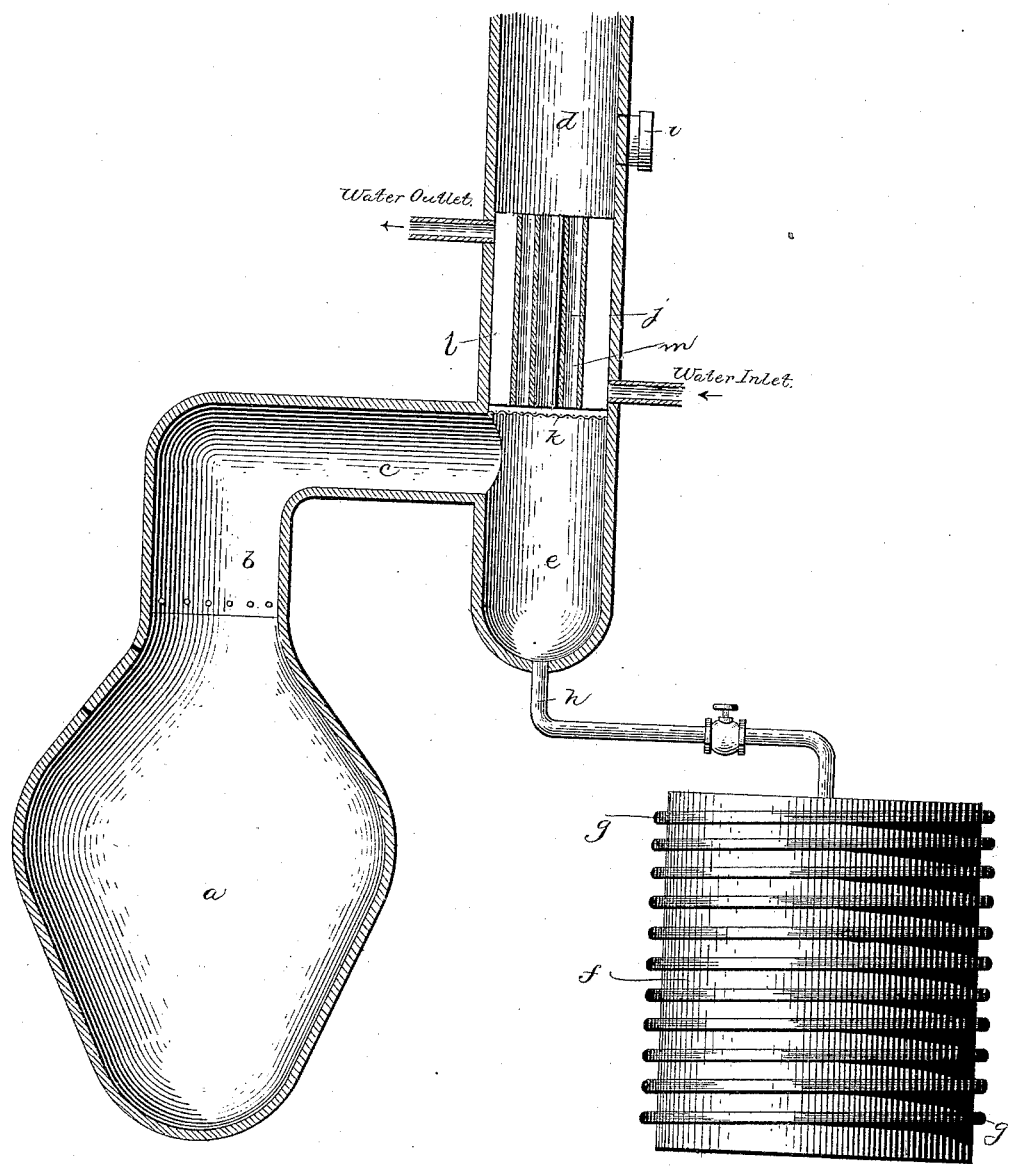

CARL HÄFNER, OF CHICAGO, ILLINOIS.

APPARATUS FOR BREWING.

SPECIFICATION forming part of Letters Patent No. 436,498, dated September 16, 1890.

Application filed February 28, 1889. Serial No. 301,482. (No model.)

*To all whom it may concern:*

Be it known that I, CARL HÄFNER, of Lake View, (Chicago,) in the county of Cook and State of Illinois, have invented certain new and useful Improvements in Apparatus for Brewing; and I do hereby declare that the following is a full, clear, and exact description of the invention, such as will enable others skilled in the art to such as it appertains to make and use the same, reference being had to the accompanying drawing, and to the letters of reference marked thereon, which forms part of this specification.

My invention relates to an improved apparatus for use in the process of making beer.

In the usual process of boiling beer or wort with hops the essential oils, aroma, and volatile oils escape and are wasted or are condensed and passed back into the brew-kettle during the boiling process; but as the essential oils, aroma, &c., vaporize and escape when the hot liquid remains at a temperature of about 20° Reaumur, and as it is necessary after boiling the wort with the hops a certain time to allow the boiling liquid to cool off in the open air, it will thus be seen that these volatile matters will still escape.

The object of my invention is to provide an improved apparatus for use in the process of manufacturing beer, whereby the essential oils, volatile matters, &c., are saved and afterward added to the beer, and whereby a great saving is made in hops. These objects are accomplished by and my invention consists in certain novel features of construction and combinations of parts, more fully described hereinafter, and particularly pointed out in the claim.

The accompanying drawing, a partial sectional elevation, illustrates the improved apparatus.

In the drawing, the reference-letter $a$ indicates any suitable normally-closed brewing kettle or vat wherein the beer or wort is boiled with hops in the usual manner. A steam-pipe $b$ opens into and extends upwardly from the normally-closed top of the brewing-vat, and is provided with an elbow forming a horizontal portion $c$, which at its outer end opens into a vertical pipe $d$ a distance above the closed rounded bottom of the same, thus forming a pocket or receptacle $e$. This pipe forms the draft and exit. It might be described that the pipe $c$ has a goose-neck $e$, and the exit-pipe $d$ extends from the top of the same.

A suitable condenser $j$ is located in the steam-escape pipe $d$, above the pocket $e$, and above the point where the pipe $c$ opens into pipe $d$. This condenser can be of any suitable construction—such as shown—consisting of a chamber $l$, filling the steam-pipe, and through which cold water is constantly flowing, and provided with vertical tubes $m$, through which the steam passes.

$f$ indicates a suitable vessel or receptacle to receive the liquid, aroma, &c., and this vessel is surrounded by a cooling-coil $g$, through which water flows, and is connected with the bottom of the pocket or goose-neck $e$ by means of a pipe $h$, having a cut-off gate or valve, and it should be observed that the pipe $h$ opens into the lowest portion of the pocket $e$.

In carrying out the process with this apparatus I proceed as follows: The desired amount of beer or wort is placed in the brewing-vat with the required amount of hops, and the mass is then boiled a certain time. Of course when the liquid reaches a certain temperature the essential oils, volatile matters, and other aroma are vaporized and pass off with the steam into the pipe $d$, and through the condenser, where the vaporized aroma, oil, &c., are liquefied and pass into the pocket or goose-neck $e$, and through the pipe $h$ into the cooling-receptacle $f$. When the wort and hops have been boiled the desired time, the liquid is drawn off and placed in the fermenting-vats, and when thus located a suitable quantity of the liquid, aroma, oil, &c., is taken from the vessel $f$ and placed in the fermenting liquid, and when the beer is thoroughly fermented these valuable qualities will be thoroughly combined with the beer, giving it a fine flavor, color, and odor. The steam-pipe $d$ is provided with a transverse wire net $k$, located beneath the condenser $j$, to prevent the hops, &c., from clogging the condenser or passing off into the pipe $d$, and above the condenser said pipe is provided with a man-hole $i$, through which access can be had to the interior of the pipe to clean the condenser.

Of course it is well known that the aromatics, essential oils, and volatile materials are those substances which give the beer its fine flavor and odor.

What I claim is—

In a brewing apparatus, the combination of a brewing-vessel, a pipe for conducting the vaporized essential oils, aroma, &c., from the brewing-vessel, said pipe having a horizontal portion and a vertical portion extending down beyond its junction with the horizontal portion to form a catch-pocket having a closed bottom provided with a discharge-pipe, a condenser located in said vertical portion of the pipe above said pocket, whereby the condensed oils, &c., are condensed, caught by the pocket, and prevented from flowing back into the brewing-vessel, a horizontal screen extending across said vertical portion of the pipe directly beneath the condenser, and a man-hole in the pipe, substantially as described.

In testimony that I claim the foregoing as my own I affix my signature in presence of two witnesses.

CARL HÄFNER.

Witnesses:
ERNEST C. SCHOLER,
FRED W. H. SNUDMACHER.